Dec. 14, 1937.  H. JÄNICKE  2,102,121

FREE PISTON ENGINE

Filed Feb. 9, 1934  3 Sheets-Sheet 1

Inventor:
Hermann Jänicke

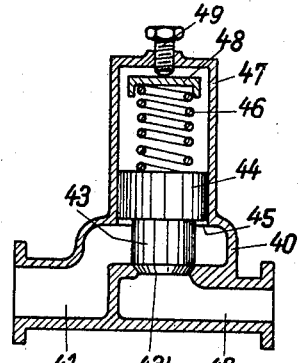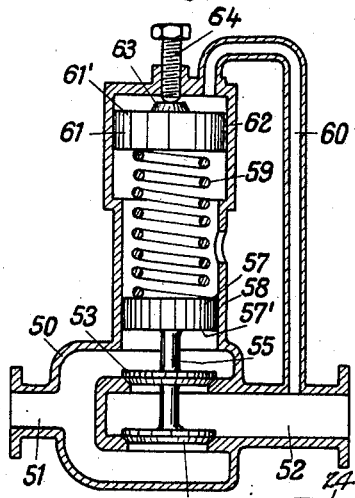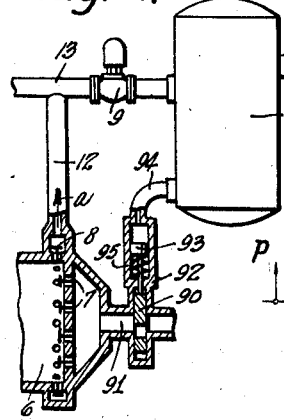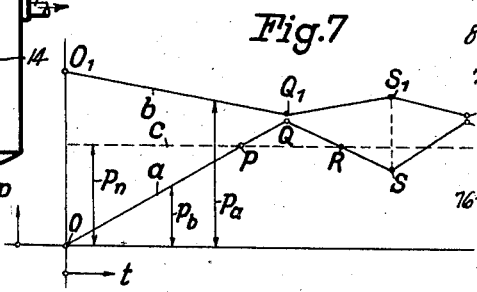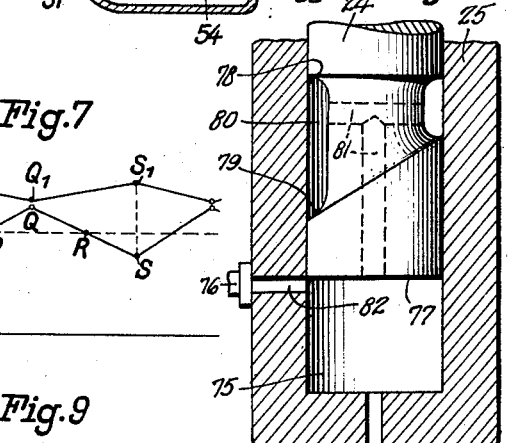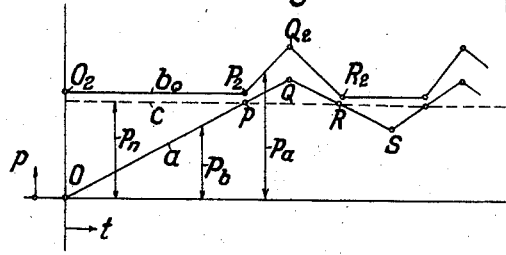

Dec. 14, 1937.  H. JÄNICKE  2,102,121
FREE PISTON ENGINE
Filed Feb. 9, 1934   3 Sheets-Sheet 3

Inventor:
Hermann Jänicke
by Karl Michaelis atty.

Patented Dec. 14, 1937

2,102,121

UNITED STATES PATENT OFFICE 2,102,121

FREE PISTON ENGINE

Hermann Jänicke, Dessau, Germany, assignor to Hugo Junkers, Dessau, Germany; Therese Junkers, née Bennhold, Gauting, Germany, administratrix of said Hugo Junkers, deceased Application February 9, 1934, Serial No. 710,483
In Germany February 16, 1933

14 Claims. (Cl. 230—56)

My invention relates to free piston engines in which a free piston or a pair of such pistons is or are arranged in a cylinder for reciprocation. It is an object of my invention to improve the efficiency of this type of engines.

In my copending U. S. application Serial No. 7,786 I have disclosed the control of a free piston motor compressor by means of a variation of the dead space and the fuel supply in a manner such that the piston stroke always remains approximately constant, independently from the variation of the compressor output; my copending U. S. application Serial No. 7,787 discloses the regulation of a free piston motor compressor by means of a variation of the pressures, i. e. the suction or delivery pressure or both these pressures combined and of the fuel supply to the motor cylinder of the motor compressor in a manner such that the piston stroke remains always approximately constant; while my copending U. S. application Serial No. 7,788 discloses the regulation of a free piston motor compressor by the simultaneous variation of at least two of the variables, which at a predetermined constant stroke of the piston determine the output of the compressor as well as the return energy in such a manner, that the portion of the total return energy, which is available for the compression of the motor charge, must always remain approximately constant.

It is an object of my present invention to operate a free piston engine in such manner that the inner end positions of the pistons are not altered by variations of the stroke of the pistons, so that the compression of the charge in the combustion chamber is independent of the stroke of the piston or pistons and the driving part of the engine operates in the most efficient manner. Under these conditions a variation of the stroke of the piston merely affects the outer end position of each piston, the inner end position remaining unaltered. In order to accomplish this, it is necessary that the total amount of energy fed back by the gas to the pistons during their return stroke hereinafter called feed-back energy be substantially constant and independent of the stroke.

It is an object of my invention to provide an improved free piston engine in which the feed-back energy is substantially constant and independent of the stroke of the piston or pistons.

In order to accomplish this, I vary the pressures occurring in the compression chambers simultaneously with a change of the length of the stroke of the piston. In a copending application Serial No. 705,906, filed January 9, 1934, by Hugo Junkers it was shown that the feed-back energy increases with decreasing stroke if the ratio $p_2:p_1$ of the discharge pressure and the suction pressure in the compressor chamber is high, while the feed-back energy decreases with decreasing stroke if this ratio is low. Thus the change of the pressures in the compression chamber should be carried out in such manner that if the ratio $p_2:p_1$ is high, the pressures are decreased with decreasing stroke, and are increased with decreasing stroke if this ratio is low. Changes of pressure of this kind alter the feed-back energy in opposite sense than the changes of the stroke. In consequence thereof it is possible by suitably dimensioning the variance of pressure to obtain by compensation a constant feed-back energy which is substantially independent of the variances of the length of the stroke. If desired only the suction pressure or only the discharge pressure in the compressor chambers or both pressures may be varied. In the latter case the change can be carried out in such manner that the ratio of these pressures remains constant. The suction pressure can be decreased by throttling the suction. It can be increased by providing a throttling in normal running and decreasing the throttling if desired. In a free piston engine comprising a multi-stage compressor the suction pressure in the higher stages can be increased by increasing the discharge pressure in the preceding stages. In order to change the discharge pressure in compressors with mechanically operated outlets the operating mechanism can be suitably adjusted. In compressors having automatically operating outlets, for instance spring-loaded valves, the load of the valves can be suitably adjusted. Another method for changing the discharge pressure consists in providing an automatic pressure-controlling device in the discharge pipe.

In order to automatically change the pressures in dependency upon the length of the stroke the following method can be adopted: The fuel delivery to the combustion chamber of the engine is controlled in dependency on the pressure in a storage tank inserted between the compression chamber and the discharge pipe, or on the pressure in the discharge pipe, in such manner that the fuel delivery is diminished with increasing pressure so that the stroke of the piston decreases with increasing pressure. The device for controlling the suction pressure or/and the discharge pressure in the compression chamber is made dependent on the pressure in the storage tank or in the discharge pipe, so that it operates in dependency on the length of the stroke of the piston. The controlling device preferably comprises members, for instance pistons, diaphragms or the like, acted upon by the pressures in the tank and in the compression chamber against a spring or the like, these members controlling a throttling device through which flows the gas, the pressure of which is to be changed.

It is another object of my invention to provide means for preventing an undesired influence of the changes of the output of the engine on the operation of the engine, particularly with respect to the exhaust, the scavenging and the delivery of fresh charge.

In order that my invention may be fully understood, reference is had to the accompanying drawings forming part of this specification and showing by way of example some embodiments of free piston engines according to my invention and some diagrams explaining the operation of the engines.

In the drawings:

Fig. 1 is an axial section of a free piston engine according to my invention, comprising two pistons, Figs. 2-5 are diagrams serving for the explanation of the operation of this engine, Figs. 6 and 8 are sectional views of devices for automatically controlling the discharge pressure in dependency on the pressure in a storage tank or a discharge pipe connected to the compression chamber.

Figs. 7 and 9 are diagrams illustrating the operation of the devices shown in Figs. 6 and 8, Fig. 10 is an axial section of another embodiment of my invention, and Figs. 11 and 12 are diagrams serving for the explanation of the operation of the engine shown in Fig. 10.

Fig. 14 is an elevation, partly in axial section, of a device for reducing the suction pressure of the compressor.

Fig. 15 is a detail of the lower portion of Fig. 13, drawn to a larger scale.

Figure 1:
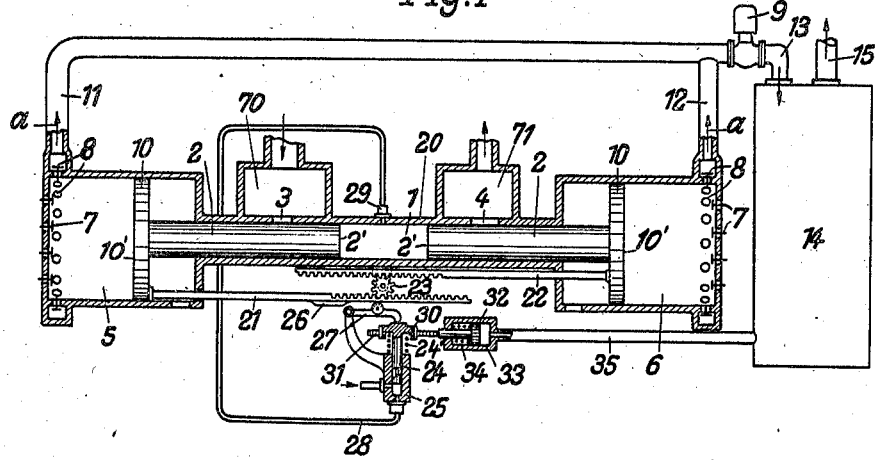
Figure 10:
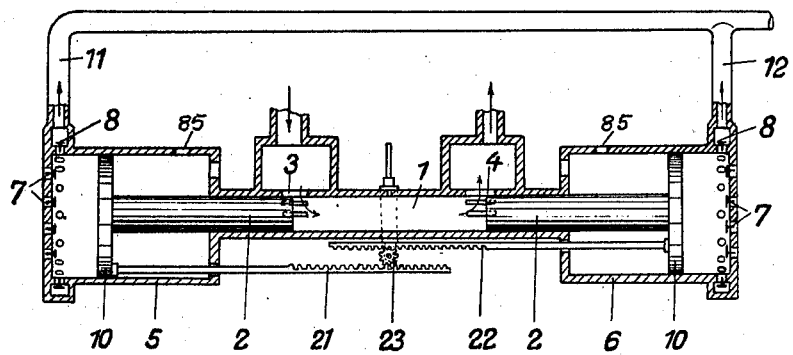
Figure 13:
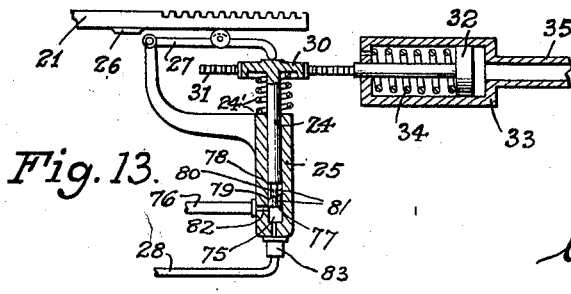
Fig. 13 is an axial section of the fuel pump shown in Fig. 1, drawn to a larger scale.

In Figs. 1, 10 and 13 corresponding parts are designed by the same reference numerals.

Referring to the drawings and first to Fig. 1, 20 is a cylinder with enlarged end portions in which two free pistons 2 having enlarged end portions 10 are arranged for simultaneous reciprocation in opposite directions. 1 is a combustion chamber formed by the mid portion of the cylinder and limited by the inner end surfaces 2' of the piston 2. 28 is a pipe for feeding fuel into the combustion chamber 1. In the end portions of the cylinder 20 compression chambers 5, 6 are provided which are limited by the outer end surfaces 10' of the enlarged end portions 10 of the pistons 2. 7 and 8 are suction valves and pressure valves of the compressor, respectively, arranged in the outer end walls of the cylinder 20. 70 is a chamber into which scavenging air is delivered from a suitable supply (not shown) and which communicates with the interior of the cylinder 20 by means of ports 3. 71 is a chamber through which the exhaust gases are withdrawn from the cylinder, this chamber communicating with the cylinder by means of ports 4. The ports 3 and 4 are shaped and arranged in such manner that during the working stroke of the pistons the ports 4 are uncovered prior to the uncovering of the ports 3. 11 and 12 are pipes leading the compressed air to a pipe 13 from which the gas or air is delivered to a storage tank 14. 15 is a discharge pipe through which the gas or air flows to the consumers. The pistons 2, 2 are coupled with each other mechanically by means of a toothed gear comprising toothed racks 21, 22 secured to the enlarged portions 10 of the pistons 2, respectively, and being in engagement with a pinion 23 rotatable about a fixed axle. In consequence thereof the pistons 2, 2 carry out movements which are strictly symmetrical. The fuel is delivered to the combustion chamber 1 by means of a pump, illustrated more clearly in Fig. 13, and comprising a cylinder 25 and a piston 24 reciprocating in the cylinder. The pump piston is driven by means of a cam 26 secured to the rack 21 and rocking an oscillating lever 27 when the pistons 2 reach a position near their inner end position. The lever 27, when acted upon by the cam 26, depresses the piston 24 which is carried back to its initial position by a spring 24' abutting against a wheel 30 supported by the piston 24 and against the top surface of the cylinder 25. Near its front edge 77 the piston of the pump is formed with a notch or annular notch 80 confined between the edges 78 and 79, the latter, which adjoins the front edge 77, extending at a pointed angle to the axis of the piston. This notch permanently communicates with the pump chamber 75 by conduits 81. A fuel suction conduit 76 ends in the cylinder 25 of the pump at such a level that the boring 82 in the cylinder wall is controlled by the edges 77 and 79 in such manner that at the end of the compression stroke this boring is connected with the pump chamber through the notch 80 and conduits 81, while in the intermediate positions it is cut off by the piston wall, until it is reopened by one of the controlling edges 77 and 79, respectively. During the suction stroke of the piston, while the end of the conduit 76 is covered by the piston wall, a vacuum is created in the pump chamber 75 and this vacuum is destroyed by the fuel entering through conduit 76 as soon as the front edge 77 of the piston uncovers the boring 82. During the compression stroke, as long as the boring 82 is closed, fuel is conveyed from the chamber 75 through the valve enclosed in the casing 83 into the conduit 28 leading to the spray nozzle 29 or the like. The quantity of fuel thus conveyed is thus rendered dependent from the stroke of the piston between the covering of the boring 82 by the front edge 77 and the uncovering by the inclined edge 79. By axially turning the piston of the pump the length of this stroke and consequently also the quantity of fuel conveyed per stroke can be varied. The piston is turned by shifting a rack 31 meshing with a toothed gear fixed to the piston. The toothed rack 31 is shifted in dependency on the pressure existing in the tank 14 by means of a piston 32 displaceable in a cylinder 33 against the power of a spring 34. The cylinder 33 is connected with the tank 14 by means of a pipe 35. In consequence thereof the amount of fuel delivered to the combustion chamber 1 and the length of the stroke of the pistons 2 depend on the pressure in the tank 14. Besides this a device 9 controlling the discharge pressure in dependency on the pressure existing in the tank 14 is inserted in pipe 13. The construction of this device will be more fully described hereinafter in connection with Figs. 6 and 8. Thus not only the amount of fuel delivered to the combustion chamber 1, but also the discharge pressure is dependent on the length of the stroke of the pistons 2.

In the operation of this engine fuel is injected into the air enclosed in the combustion chamber 1 in the manner described above and is ignited by the heat of the compression of this air caused by the return stroke of the pistons 2, when the pistons have reached their inner dead centre positions. In consequence thereof the pistons 2 are forced asunder and their outer end faces 10' will now compress the air or other gas enclosed in the compression chambers 5 and 6 and will force them through the pressure valves 8 so that they escape in the direction of the arrows $a$ through the pipes 11, 12 and 13 to the tank 14. While the pistons 2 are moving outwardly, the pressure in the combustion chamber 1 drops and the inner edge of the right hand piston will uncover the exhaust port 4 allowing the gases of combustion to escape to chamber 71. Directly thereafter the left hand piston will uncover the port 3 of the scavenging air chamber 70 and a current of scavenging air will now flow through the cylinder 20 in the direction from ports 3 to ports 4, carrying along with it the rest of exhaust gases which still remained in the cylinder. During the outward stroke of the pistons the kinetic energy imparted to them by the combustion gases is converted into compressive energy in the compression chambers 5, 6, and the pistons will come to a standstill after having uncovered the ports 3 and 4. They are now acted upon by the compressed air which remained over in the compression chambers 5, 6, and this air now forces the pistons back. On their inward stroke the pistons 2 will compress the scavenging air enclosed between them to such an extent that the fuel which is injected through pipe 28 into the combustion chamber 1 towards the end of the inward stroke is ignited, thereby forcing the pistons asunder again. During the inward stroke of the pistons the pressure in the compression chambers 5, 6 drops gradually until it has become so low that fresh air or gas is sucked into the compression chambers through the suction valves 7.

Fig. 14 illustrates a device for reducing the suction pressure of the compressor. In this figure those parts, which are also shown in Fig. 1, are marked with the same reference numerals. The suction valves 7 of the compressor 6 are connected to a common suction pipe 91, provided with a throttle 90. The throttle is connected with a piston 93 arranged in a cylinder 92 for reciprocation. This piston is acted upon through the pipe 94 by the pressure in the reservoir 14, the pressure tending to shift the throttle 90 into closing position, while a spring 95 counteracts this tendency. This spring is so dimensioned that up to a predetermined pressure in the reservoir the passage controlled by the throttle remains open, while in proportion as the pressure in the reservoir rises, this passage is gradually throttled.

Figure 2:
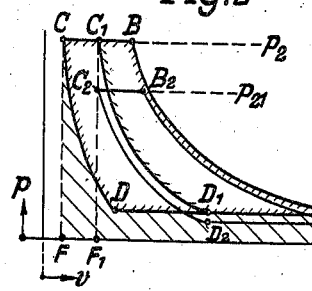
Figure 3:
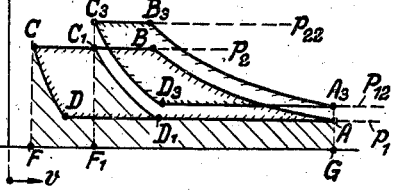

Referring now to Figs. 2–5, in which the abscissae designate the volume $v$, the ordinates the pressure $p$ of the gas in the compressor chamber, it has been shown in the copending application mentioned above that if A, B, C, D is the diagram of an operating cycle of the engine, the feed-back energy is represented by the area of the surface C, F, G, A, D, C. It was further shown that the feed-back energy increases with decreasing stroke, if the ratio $p_2:p_1$ is high, while the feed-back energy decreases with decreasing stroke when the ratio $p_2:p_1$ is low. Each of the Figs. 2 and 3 shows diagrams corresponding to two different strokes G, F and G, $F_1$. In Fig. 2 the ratio $p_2:p_1$ is high, in Fig. 3 this ratio is low. In Fig. 2 the diagram A, B, $C_1$, $D_1$ corresponds to a smaller stroke than the diagram A, B, C, D. The feed-back energy corresponding to the cycle A, B, $C_1$, $D_1$ is considerably larger than the feedback energy corresponding to the cycle A, B, C, D. Now according to my invention in changing the stroke from G, F to G, $F_1$, the pressures $p_2$ and $p_1$ are changed to lower values, $p_{21}$ and $p_{11}$, respectively, so that the diagram for the stroke G, $F_1$ becomes the cycle $A_2$, $B_2$, $C_2$, $D_2$, having a smaller feed-back energy than the cycle A, B, $C_1$, $D_1$, and by suitably choosing the values $p_{21}$ and $p_{11}$ it is possible to obtain, that the feed-back energy corresponding to the stroke G, $F_1$ is substantially the same as the feed-back energy corresponding to the stroke G, F.

Fig. 3 shows corresponding diagrams for a lower ratio $p_2:p_1$. When, in diminishing the stroke from G, F to G, $F_1$, the pressures $p_2$ and $p_1$ are not altered, the diagram corresponding to the small stroke is represented by the curve A, B, $C_1$, $D_1$, and the corresponding feed-back energy represented by the area of the surface G, A, $D_1$, $C_1$, $F_1$ G is considerably smaller than the feed-back energy corresponding to the diagram A, B, C, D, which is represented by the area of the surface G, A, D, C, F, G. In order to hold the feed-back energy substantially independent of the stroke, the pressures $p_2$ and $p_1$ are suitably increased to the values $p_{22}$ and $p_{12}$, respectively, when the stroke is decreased, so that the diagram corresponding to stroke G, $F_1$ is given by the curve $A_3$, $B_3$, $C_3$, $D_3$, the values $p_{22}$ and $p_{12}$ being so chosen that the surface G, $A_3$, $D_3$, $C_3$, $F_1$, G has the same area as the surface G, A, D, C, F, G.

As will be seen from Figs. 2 and 3, the pressures $p_2$ and $p_1$ should be decreased with decreasing stroke, when the ratio $p_2:p_1$ is high, while the pressures $p_2$ and $p_1$ should be increased with decreasing stroke, when the ratio $p_2:p_1$ is low.

Figure 4:
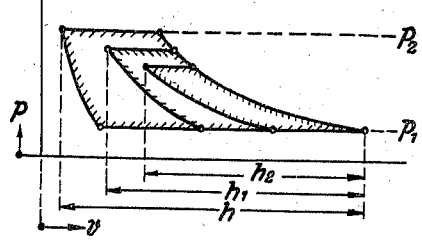
Figure 5:
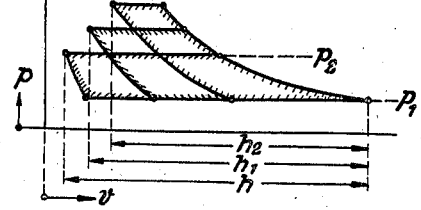

Figs. 4 and 5 illustrate diagrams of an engine in which the pressures $p_2$ and $p_1$ in the compressor chambers are controlled according to my invention, each figure showing three diagrams corresponding to different strokes $h$, $h_1$, $h_2$, respectively. In these diagrams only the discharge pressure $p_2$ is changed, the suction pressure $p_1$ being held constant.

As will be seen from the foregoing, the device 9 in Fig. 1 must be so designed in some cases as to increase the discharge pressure with decreasing stroke, while in other cases the device 9 should decrease the discharge pressure with decreasing stroke. It should be borne in mind that it is necessary to construct the device 9 in such manner, that the discharge pressure is increased or decreased when the pressure in the tank 14 decreases, since the fuel delivery to the combustion chamber 1 and in consequence thereof the stroke of the pistons decreases with decreasing pressure in the tank 14. Suitable devices for controlling the discharge pressure in dependency on the pressure in tank 14 are shown in Figs. 6 and 8.

Referring first to Fig. 6 showing a device for automatically increasing the discharge pressure when the pressure in the tank 14 decreases and vice versa, 40 is a casing connected to the compressor chambers 5, 6 by means of a pipe 41, and to the storage tank 14 by means of a pipe 42. The pipes 41 and 42 communicate with each other by means of an opening in which is mounted a valve 43. 44 is a piston rigidly connected to the valve 43 and reciprocating in a cylinder 47, in which a spring 46 is arranged which abuts against the upper end surface of the piston 44 and an abutment 48 adjustable by means of a screw 49. The lower end surface 45 of the piston 44 is acted upon by the pressure existing in the compression chambers, while the lower surface 43' of the valve 43 is acted upon by the pressure in the tank 14. The valve is normally held closed by the spring 46 and is opened when the load of the spring is overcome by the cooperation of the pressures acting upon the surfaces 45 and 43', so that, when the pressure in the tank 14 is increased, the valve will open at a lower pressure in the compression chamber, whereby with increasing pressure in tank 14 the discharge pressure of the engine is decreased.

Fig. 8 illustrates a construction of the device 9 by which the discharge pressure is increased with increasing pressure in tank 14. The casing 50 of the device is connected to the compressor chambers by means of a pipe 51 and to tank 14 by means of a pipe 52. The pipes 51 and 52 communicate with each other by means of a valve comprising two valve discs 53, 54 of equal size and normally closing the openings, through which the pipes 51 and 52 communicate with each other. To the upper end of the valve stem 55 a piston 57 is secured which reciprocates in the reduced portion 58 of a cylinder, the upper portion 62 of which has a somewhat larger diameter. The lower end face 57' of the piston 57 is acted upon by the pressure in the compression chambers against the force of a spring 59 arranged in the cylinder 58, 62, and abutting with its upper end against a piston 61 reciprocating in the cylinder 62, so that the tension of the spring 59 depends on the position of the piston 61, the upper end face 61' of which is acted upon by the pressure tank 14, the pipe 52 being connected to the upper portion of cylinder 62 by a pipe 60. 64 is an adjustable screw against which the piston 61 abuts with a stop 63. Since the tension of the spring 59 is increased with increasing pressure in tank 14, the valve 53, 54 will open at a pressure which is the higher, the higher the pressure in tank 14, so that the discharge pressure is increased with increasing pressure in tank 14.

Figs. 7 and 9 illustrate pressure-time diagrams of the devices shown in Figs. 6 and 8, respectively. The abscissa in the diagrams is the time $t$, the ordinates being the pressure $p$. The pressure $p_b$ in tank 14 is illustrated by the curve $a$ beginning at the point O with the value zero. The pressure in the tank then gradually increases to its normal value $p_n$ indicated in the diagrams by the dotted straight line. This pressure is reached for the first time at the point P. If only a small quantity of compressed gas is consumed, the pressure in tank 14 will still increase to a value corresponding to point Q. Be it assumed that at this point the control of the fuel delivery starts, so that the gas delivery to the tank is decreased and the pressure in the tank decreases on account of the consumption of gas. In consequence thereof the pressure curve $a$ drops and reaches its normal value at R and decreases further to S, at which point the pressure in the tank 14 is increased again, because in the meantime the output of the compressor has been controlled by means of the device shown in Fig. 6. In Fig. 7, corresponding to the device shown in Fig. 6, curve $b$ illustrating the discharge pressure $p_a$ starts at $O_1$ with its maximum value, since when the tank 14 is empty, the entire force of the spring 46 counteracts the pressure in the compression chambers. When the pressure in tank 14 increases, the discharge pressure decreases correspondingly and reaches its minimum value at $Q_1$ corresponding to point Q. The discharge pressure is then increased to the point $S_1$ corresponding to point S, and drops again afterwards.

In the diagram shown in Fig. 9 corresponding to the device shown in Fig. 8 the curve $a$ is similar to that shown in Fig. 7. The curve $b_0$ however illustrating the discharge pressure starts at its maximum value $O_2$ being slightly above the normal value $p_n$ of the pressure in tank 14 and remains constant as long as the piston 61 is not displaced. At $P_2$ corresponding to point P, at which the pressure in tank 14 reaches its normal value, the piston 61 is displaced so that the tension of spring 59 and in consequence thereof the discharge pressure is increased, the latter reaching its maximum value at $Q_2$ corresponding to point Q. Afterwards the discharge pressure decreases to point $R_2$ corresponding to point R, at which the pressure in tank 14 reaches its normal value again. Now the discharge pressure remains constant, while the pressure in tank 14 is below its normal value. The discharge pressure rises again, when the pressure in tank 14 exceeds its normal value, and so on.

It should be understood that the tank 14 may be omitted if desired, and that instead of the pressure in the tank 14 the pressure in the discharge pipe 13 or 15 may be used for controlling the fuel delivery and/or the discharge pressure, the pipe 35 being in this case connected to the pipe 13 or 15.

In the free piston compressors of the usual type the portion of the stroke, during which the compressed gases are discharged from the compression chambers, substantially coincides with that portion of the stroke, during which the combustion gases finish their expansion and the control ports are uncovered by the piston or pistons forming part of the flying mass. The amount of energy afforded for discharging the compressed gases is considerably larger than the amount of energy fed from the combustion gases during this portion of the stroke, and must therefore be presented to a large extent by the kinetic energy stored in the flying mass. In consequence thereof the flying mass is retarded in this portion of the stroke to a very different degree, according to the size of the output of the compressor. In accordance therewith the velocities with which the control ports of the cylinder are uncovered, differ greatly from each other and the course of flow through these ports changes appreciably, since it is dependent on the product of the uncovered section and the time of uncovering. These changes can influence the operation of the engine in an undesirable manner with respect to the exhaust, the scavenging and the delivery of fresh charge. In order to avoid this drawback, I provide means for bringing into effect the amount of energy for discharging the compressed gas from the compression chamber only after the flying mass has traveled through the distance required for the carrying out of the working cycle in the combustion chamber, viz. only after the pistons have uncovered the control ports to an extent sufficient for exhaust, scavenging and loading. The energy fed to the compressor, until the ports are uncovered, will then remain substantially constant irrespective of the quantity of gas discharged from the compression chambers. In consequence thereof a change of the output of the compressor does not detrimentally influence the movement of the pistons from the beginning of the stroke to the uncovering of the control ports, so that the combustion cycle is carried out without trouble even if the discharge output of the compressor is changed.

A free piston engine of this type is illustrated in Fig. 10 corresponding substantially to the engine shown in Fig. 1, the ports 3 and 4 being more clearly illustrated and the members for controlling the fuel delivery to the motor cylinder 1 and the discharge pressure of the compressor in dependency on the stroke being omitted. The operation of this engine shall be described in connection with the diagram shown in Figs. 11 and 12, in which the abscissae designate the volumes $v$, the ordinates the pressure $p$. Each figure shows the diagram of the gas pressures in the motor cylinder during the combustion stroke of the motor pistons 2 (line A—F) and the diagram of the gas pressures in the compression cylinders during the compression stroke of the compressor pistons 10 (line G—J) of the engine shown in Fig. 10. In reality these two strokes coincide, since the pistons 2 and 10 form an integral freely movable mass.

Figure 11:
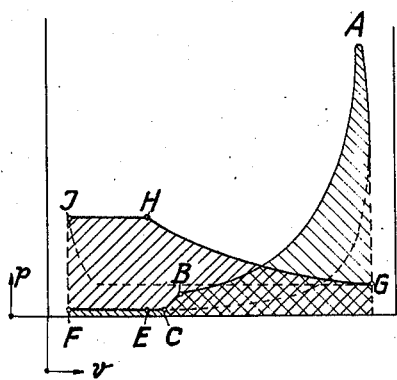

Referring first to Fig. 11, the expansion of the combustion gases is shown by the curve A, F. At the point B the uncovering of the exhaust ports 4 starts. In consequence thereof the pressure drops quickly to the counter pressure existing in the exhaust pipe, this pressure being reached at C. At this point the uncovering of the inlet ports 3 is started and the scavenging and loading of the combustion chamber takes place. The compression chambers of the compressor are dimensioned for instance by suitably dimensioning their dead spaces in such manner that the compression started at G at the beginning of the stroke extends over such a length of stroke, that at the end of the compression (point H) the inlet ports 3 of the motor cylinder are already uncovered to a certain extent (point E). At the point H starts the discharge of the compressed gases; it is carried on as far as the point J corresponding to the outer dead centre position of the pistons. During this portion of the stroke only the very low scavenging pressure illustrated in the diagram by the horizontal straight line E, F exists in the combustion chamber. An appreciable transfer of energy from the combustion chamber to the compressor does not take place during this portion of the stroke, so that the discharge energy, the amount of which depends on the amount of gas to be discharged and which is fed to the compressor during the portion H, J of the stroke, is almost totally fed by the kinetic energy of the flying mass. The energy afforded for compression and fed to the compressor during the portion G, H of the stroke is independent of the amount of gas to be discharged and remains constant, provided that the discharge pressure of the compressor is not changed. Thus, since up to a sufficient uncovering of the control ports 3 and 4 always the same amount of energy is drawn from the flying masses, and since their retardation depending on the discharge energy only begins after the uncovering of the ports, a change of the discharge energy cannot detrimentally influence the control of the ports 3, 4.

In the event that in the manner above described in connection with Figs. 1–5 the discharge pressure of the compressor is changed simultaneously with a control of the output, so that the point H is shifted up or down on the compression curve starting at the point G, the engine is preferably dimensioned in such manner that the lowermost position of point H is at a point at which the outlet and inlet ports are already uncovered.

Figure 12:
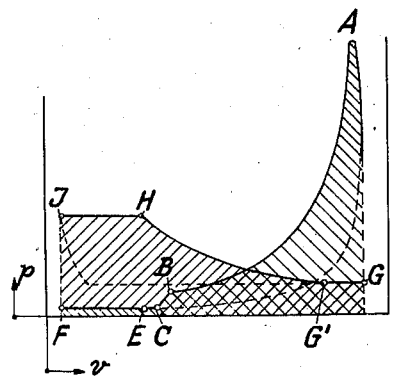

In some cases, for instance in compressors operating with a low ratio of discharge pressure and suction pressure, it is desirable to decrease the ratio between the partial stroke during which the compression is performed, and the total stroke. This may be accomplished by starting the compression not at the point G, but at the point G', as shown in Fig. 12. In order to prevent compression during the portion G, G' of the stroke, means may be provided for discharging without resistance gas from the compression chambers during this portion of the stroke, which may be done by holding open the suction valves 7 of the compressor during this portion of the stroke. Instead of this, separate mechanically operated outlets, for instance openings 85 in the walls of the compressor chambers (Fig. 10), may be provided, these openings being so arranged that they are passed by the pistons 10 at the point G' of the stroke. The energy freed in the combustion chamber during the portion G, G' of the stroke is fully stored as kinetic energy in the pistons, except the small discharge energy fed to the compressor piston during this portion of the stroke.

In an engine of this type the pistons travel through a relatively large portion of the stroke from the uncovering of the ports (point E) to the end of the stroke (point F) and the scavenging and loading of the combustion chamber is thereby greatly improved, because the inlet and outlet ports of the motor cylinder are uncovered during a relatively long time, inasmuch as during the portion E, F of the stroke the velocity of the pistons is relatively small. The transfer of heat from the hot pistons and the piston rings to the cooled cylinder walls is improved by the length of the stroke portion E, F. This is particularly important in free piston compressors operating at high frequency (number of double strokes per minute) in order to obtain advantageous courses of flow in the control members of the compressor. In general it is desirable to keep the velocity of flow within lower limits in order to diminish the losses caused by whirling and throttling. Since the pressure valves of the compressor are opened only after a considerable portion of the total stroke has been carried out, so that the velocity of the pistons has already become small, the velocity of flow in the outlet members of the compressors is correspondingly lowered.

I wish it to be understood that I do not desire to be limited to the exact details of construction shown and described, for obvious modifications will occur to a person skilled in the art.

I claim:—

1. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a combustion chamber in said motor cylinder adjoining the free end of the motor piston arranged in said cylinder, a storage tank communicating with said compressor chamber and adapted to be supplied with compressed gas from said compressor chamber, means for supplying fuel to said combustion chamber, means for controlling the amount of fuel supplied to said combustion chamber in dependency on the pressure in said storage tank and a valve arranged near the outlet of said compressor chamber for controlling the exhaust pressure in said compressor chamber in dependency from the pressure in said storage tank, said valve comprising a movable member for controlling the closing and opening of said valve and a spring arranged to act on said member in closing direction, said member being provided with two faces arranged to be acted upon in opening direction by the exhaust pressure in said compressor chamber and by the pressure in said storage, respectively.

2. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a combustion chamber in said motor cylinder adjoining the free end of the motor piston arranged in said cylinder, a storage tank communicating with said compressor chamber and adapted to be supplied with compressed gas from said compressor chamber, means for supplying fuel to said combustion chamber, means for controlling the amount of fuel supplied to said combustion chamber in dependency on the pressure in said storage tank and a valve arranged near the outlet of said compressor chamber for controlling the exhaust pressure in said chamber in dependency from the pressure in said storage tank, said valve comprising a movable member for controlling the closing and opening of said valve, said member being formed with a surface arranged to be acted upon in opening direction by the exhaust pressure in said compressor chamber, a movable counter member formed with a surface arranged to be acted upon by the pressure in said storage tank so as to be approached to said member, and a spring arranged between and holding apart said movable member and said counter member and tending to close said movable member in closing direction.

3. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a combustion chamber in said motor cylinder adjoining the free end of the motor piston arranged in said cylinder, intake ports for fresh charge and exhaust ports for the exhaust gases arranged in the wall of said combustion chamber, suction valves and exhaust valves arranged in the wall of said compressor chamber, and means adapted to influence the rise of pressure in said compressor chamber during the compression stroke in such manner that said exhaust valves remain closed until said motor piston has uncovered said ports of the combustion chamber, means for varying the supply of fuel to said combustion chamber and thereby also the length of stroke of said piston, and means for throttling the intake in said compressor chamber in dependency from the length of stroke of said piston.

4. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a combustion chamber in said motor cylinder adjoining the free end of the motor piston arranged in said cylinder, intake ports for fresh charge and exhaust ports for the exhaust gases arranged in the wall of said combustion chamber, suction valves and exhaust valves arranged in the wall of said compressor chamber, and means adapted to influence the rise of pressure in said compressor chamber during the compression stroke in such manner that said exhaust valves remain closed until said motor piston has uncovered said ports of the combustion chamber, means for varying the supply of fuel to said combustion chamber and thereby also the length of stroke of said piston, and throttling means on the exhaust side of said compressor chamber adapted to vary the exhaust pressure in said compressor chamber in dependency from the length of stroke of said piston.

5. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, a pressure regulating valve arranged in series to said exhaust valve and adapted to maintain a predetermined minimum exhaust pressure in said compressor chamber, a combustion chamber in said motor cylinder adjoining the free end of the motor piston arranged in said cylinder, intake ports for fresh charge and exhaust ports for the exhaust gases arranged in the wall of said combustion chamber, the dead space of said compressor chamber being so dimensioned as to influence the rise of pressure in said compressor chamber during the compression stroke in such a manner that the exhaust of compressed gas through the exhaust valves of said compressor chamber is prevented from taking place, until said motor piston has uncovered said ports, means for varying the length of stroke of said piston and means for varying the suction pressure in said compressor chamber in dependency from the length of stroke of said piston.

6. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, a combustion chamber in said motor cylinder adjoining the free end of the motor piston arranged in said cylinder, intake ports for fresh charge and exhaust ports for the exhaust gases arranged in the wall of said combustion chamber, the dead space of said compressor chamber being so dimensioned as to influence the rise of pressure in said compressor chamber during the compression stroke in such a manner that the exhaust of compressed gas through the exhaust valves of said compressor chamber is prevented from taking place, until said motor piston has uncovered said ports, means for varying the length of stroke of said piston and means for varying the exhaust pressure in said compressor chamber in dependency from the length of stroke of said piston.

7. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a cavity communicating with said compressor chamber and adapted to be supplied with compressed air from said compressor chamber, means for controlling the amount of fuel supplied to said cylinder in dependency on the pressure in said cavity, and automatic means for controlling the suction pressure in said compressor chamber in dependency from the pressure in said cavity.

8. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, means for maintaining the proportion of the suction pressure to the exhaust pressure in said compressor chamber on a high constant value, a pressure regulating valve arranged in series to said exhaust valve and adapted to maintain a predetermined minimum exhaust pressure in said compressor chamber, and means adapted to reduce the suction pressure in the compressor when the piston stroke decreases.

9. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, means for maintaining the proportion of the suction pressure to the exhaust pressure in said compressor chamber at a low constant value, a pressure regulating valve arranged in series to said exhaust valve and adapted to maintain a predetermined minimum exhaust pressure in said compressor chamber, and means adapted to increase the suction pressure in the compressor when the piston stroke decreases.

10. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, a pressure regulating valve arranged in series to said exhaust valve and adapted to maintain a predetermined minimum exhaust pressure in said compressor chamber, and including means for varying the suction pressure in said compressor chamber in dependency from the length of stroke of said free piston.

11. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, a pressure regulating valve arranged in series to said exhaust valve and adapted to maintain a predetermined minimum exhaust pressure in said compressor chamber, and including means for varying the suction pressure and the exhaust pressure in said compressor chamber in dependency from the length of stroke of said free piston.

12. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, a pressure regulating valve arranged in series to said exhaust valve and adapted to maintain a predetermined minimum exhaust pressure in said compressor chamber, and including means for varying the suction pressure and the exhaust pressure in said compressor chamber in dependency from the length of stroke of said free piston in such manner that both said pressures, measured from absolute zero pressure, vary in the same proportion, so that these pressures themselves are always equally related to each other.

13. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, means for maintaining the proportion of the suction pressure to the exhaust pressure in said compressor chamber on a high constant value, a pressure regulating valve arranged in series to said exhaust valve and adapted to maintain a predetermined minimum exhaust pressure in said compressor chamber, and including means for varying the exhaust pressure as well as the suction pressure in said compressor chamber in the same proportion in dependency from the variations of the length of stroke of said free piston and in the same sense as these variations of stroke.

14. A free piston motor compressor comprising a motor cylinder and a free motor piston arranged in this cylinder, a compressor chamber adjoining one end of said cylinder, a compressor piston arranged in this compressor chamber for reciprocation therein and fixed to said motor piston, a suction and an exhaust valve associated with said compressor chamber, means for varying the length of stroke of said motor piston and thereby enabling the output of the motor compressor to be regulated, means for maintaining the proportion of the suction pressure to the exhaust pressure in said compressor chamber at a low constant value, a pressure regulating valve arranged in series to said exhaust valve and adapted to maintain a predetermined minimum exhaust pressure in said compressor chamber, and including means for varying the exhaust pressure as well as the suction pressure in said compressor chamber in the same proportion in dependency from the variations of the length of stroke of said free piston and in a sense opposite to that of said changes of stroke.

HERMANN JÄNICKE.